(12) United States Patent
Dillon et al.

(10) Patent No.: US 10,091,128 B2
(45) Date of Patent: Oct. 2, 2018

(54) DYNAMIC HISTORY MULTISTREAM LONG RANGE COMPRESSION

(71) Applicant: Hughes Network Systems, LLC, Germantown, MD (US)

(72) Inventors: Douglas Merrill Dillon, Gaithersburg, MD (US); Uday R. Bhaskar, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 219 days.

(21) Appl. No.: 15/162,260

(22) Filed: May 23, 2016

(65) Prior Publication Data

US 2017/0339064 A1    Nov. 23, 2017

(51) Int. Cl.
*H04L 12/16* (2006.01)
*H04L 12/925* (2013.01)
*H04L 29/06* (2006.01)

(52) U.S. Cl.
CPC ........ *H04L 47/722* (2013.01); *H04L 65/4069* (2013.01); *H04L 65/602* (2013.01); *H04L 65/80* (2013.01)

(58) Field of Classification Search
None
See application file for complete search history.

(56) References Cited

U.S. PATENT DOCUMENTS

| 5,374,916 A * | 12/1994 | Chu ............... H03M 7/3086 340/146.2 |
| 6,400,289 B1 | 6/2002 | Banerji |
| 6,492,917 B1 | 12/2002 | Goel |
| 2013/0018932 A1 | 1/2013 | Bhaskar |
| 2014/0223029 A1 | 8/2014 | Bhaskar |
| 2014/0223030 A1 | 8/2014 | Bhaskar |

OTHER PUBLICATIONS

ISR and Written Opinion for PCTUS2017034083 dated Aug. 7, 2017, 15 pages.

* cited by examiner

*Primary Examiner* — Alex Skripnikov
(74) *Attorney, Agent, or Firm* — Sheppard Mullin; Jonathan Marina; Daniel Yannuzzi

(57) ABSTRACT

Dynamic history multistream long range compression (DHC) techniques are described for efficiently compressing multiple, prioritized data streams received over a channel. A history buffer is associated with each received stream and a DHC compressor dynamically allocates fixed sized history sections to and from each history buffer. In implementations, the DHC compressor makes stream history size adjustments prior to compressing a block of data and sends information identifying the change in history size to a DHC decompressor. The DHC decompressor sends signaling information to the DHC compressor that is used to ensure that the DHC decompressor can operate with a fixed amount of total history memory.

18 Claims, 12 Drawing Sheets

DYNAMIC HISTORY MULTISTREAM LONG RANGE COMPRESSION

TECHNICAL FIELD

The present disclosure relates generally to long range compression. More particularly, some embodiments of the present disclosure are directed toward systems and methods for providing multi-stream long range compression.

BACKGROUND

Analysis of internet traffic reveals that for certain content types, which constitute a significant portion of the total traffic, a high degree of redundancy exists in the transmitted data. This manifests itself in the form of macro redundancies and micro redundancies. Macro redundancies are duplications of long byte strings, which occur when the same or similar data entities, (typically comprising hundreds of bytes or more) are repeatedly transmitted on a link between two end points. Micro redundancies occur due to the fine grain syntax underlying the byte sequences, which imposes a structure so that some smaller byte patterns (typically a few bytes in length) occur more frequently than others. Both of these types of redundancies can be exploited by data compression techniques to transmit the data more efficiently. The benefit is conservation of communication link resources (such as channel bandwidth and power) and an improvement in the user experience due to lower latency and faster response time.

Redundancies in a data stream can appear at many levels. At the highest level, an entire web page or document that was previously transmitted may be retransmitted on the data stream (e.g., due to a user repeatedly requesting the web page). At a lower level, an object within a web page (e.g., an image of an advertisement) may be frequently retransmitted, because it is common across multiple popular web pages. At the lowest level, a byte segment that was previously transmitted may reappear on the data stream. Each of these redundancies can be exploited by preventing the retransmission of the duplicate data, provided appropriate memory and processing techniques are employed at both ends of the connection.

Further, the range (e.g., the separation of the number of transmitted bytes from an occurrence of a byte segment to its redundant occurrence) over which redundancies occur in the data stream can span from a few bytes to several tens or hundreds of megabytes. This range may depend on several factors such as the type of content, speed of the link, usage pattern of the user, the number of users attached to the end point etc. Moreover, the redundancies can be micro redundancies, where the duplications are only a few bytes long or much longer macro redundancies.

Lossless data compression is a technique that compresses data streams for transmission over communications link by reducing data redundancies within the data streams, facilitating improved efficiency and utilization of link capacity. Lossless data compression algorithms exploit statistical redundancy to represent data more concisely, without losing information. A compressor is used to compress packets at one end of the link. At the other end of the link, a decompressor losslessly recovers the original packets.

There exists a class of data compression techniques known as long range data compression, which refers to compression techniques that compress data based on a relatively large data dictionary reflecting one or more data streams over a corresponding historical length of time. In conventional applications of such techniques, the length of time is proportional to the size of the dictionary—the larger the dictionary, the larger the ability to compress exploiting redundancy over longer data history.

Another class of data compression techniques exists, which are referred to as short-range data compression techniques. Rather than relying on a large dictionary (a long historical view of the data stream), short-range data compression techniques operate on small data sets, such as grammar-based algorithms, such as Yang-Kieffer (YK) universal data compression (see, e.g., U.S. Pat. Nos. 6,400,289 and 6,492,917). For example, grammar-based algorithms construct context-free grammar deriving from a single string, and also may apply statistical predictions referred to as arithmetic coding. Other examples of short-range compression techniques belong to the Lempel-Ziv family of compressors (LZ77 and LZ78, and derivatives thereof, such as gzip, compress, or V.44).

Conventional lossless data compression techniques have a stringent requirement that the packets cannot be reordered or lost during transport from the compressor to the decompressor. However, when traffic is transported as prioritized streams, this requirement can only be met on a per-stream basis, rather than the aggregate traffic as a whole. This is because a packet transported on a higher priority stream can overtake a packet transported on a lower priority stream. For example, in the case of a higher priority packet and a lower priority packet, where the higher priority packet is compressed later in time than the lower priority packet, but is provided transmission priority over the lower priority packet, the higher priority packet (while actually later in time at the compressor) will arrive at the decompressor earlier in time from the lower priority packet. Hence, the packets will arrive at the decompressor out of order, which would result in a failure of the decompression if it is applied to the aggregate traffic. Consequently, traditional compression techniques can be applied only on a per-stream basis and not on the aggregate traffic.

U.S. Patent Publication No. 2014/0223030 describes one method of applying multistream long range compression on multiple streams on an aggregated basis. U.S. Patent Publication No. 2014/0223030, however, requires a byte cache extension of the decompressor (i.e., the decompressor cache is larger than the compressor cache) to handle packets received out of order, which requires the use of additional memory.

SUMMARY

In accordance with various embodiments of the technology disclosed herein, dynamic history multistream long range compression (DHC) techniques are described for efficiently compressing multiple, prioritized data streams received over a channel.

In a first embodiment, a method for compressing a data block associated with a plurality of prioritized data streams is described. The method may include: receiving a data block associated with a first data stream of the plurality of prioritized data streams, where each of the plurality of prioritized data streams is associated with a history buffer including one or more allocated history sections; determining if a history size increase is permitted for the history buffer of the first data stream based on a count of a number of history size increases previously granted to the plurality of prioritized data streams; and compressing the data block using a long range compressor associated with the first stream.

In a further implementation of the first embodiment, the method may additionally include: determining that a history size increase is permitted for the history buffer of the first data stream; in response to determining that a history size increase is permitted, allocating an additional history section to the history buffer of the first data stream; and inserting the allocated additional history section into the history buffer of the first data stream. This implementation may additionally include: copying the compressed data block into the allocated additional history section of the history buffer; tagging the compressed data block with a history size increase; and transmitting the tagged compressed data block over a network.

In yet a further implementation of the first embodiment, the method may additionally include: determining if a history size decrease is desirable for a history buffer of any one of the plurality of prioritized data streams; in response to determining that a history size decrease is desirable, determining which of the plurality of prioritized data streams are eligible for a reduction in history size; and deallocating a history section from the history buffer of one of the plurality of prioritized data streams that are eligible for a reduction in history size.

In a second embodiment, a method for decompressing data blocks associated with a plurality of prioritized data streams is described. The method may include: receiving a compressed data block associated with a first data stream of a plurality of prioritized data streams, where each of the plurality of prioritized data streams is associated with a history buffer including one or more allocated history sections; determining if the received compressed data block is tagged with a history size increase; and decompressing the received compressed data block using a long range decompressor associated with the first stream.

In a further implementation of the second embodiment, the method includes: in response to determining that the received compressed data block is tagged with a history size increase, allocating an additional history section to the history buffer of the first data stream; and inserting the allocated additional history section into the history buffer of the first data stream. This implementation may additionally include writing the decompressed data block into the inserted history section of the history buffer of the first data stream.

In yet a further implementation of the second embodiment, the method may additionally include: receiving a stream history decrease signaling message from a compressor, where the stream history decrease signaling message is associated with a stream of the plurality of prioritized data streams; and deallocating a history section from the history buffer of the stream associated with the stream history decrease signaling message. This implementation may additionally include: increasing a count of a number of stream history decrease signaling messages received; and transmitting a decrease signaling block to a compressor, the decrease signaling block including the increased count.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
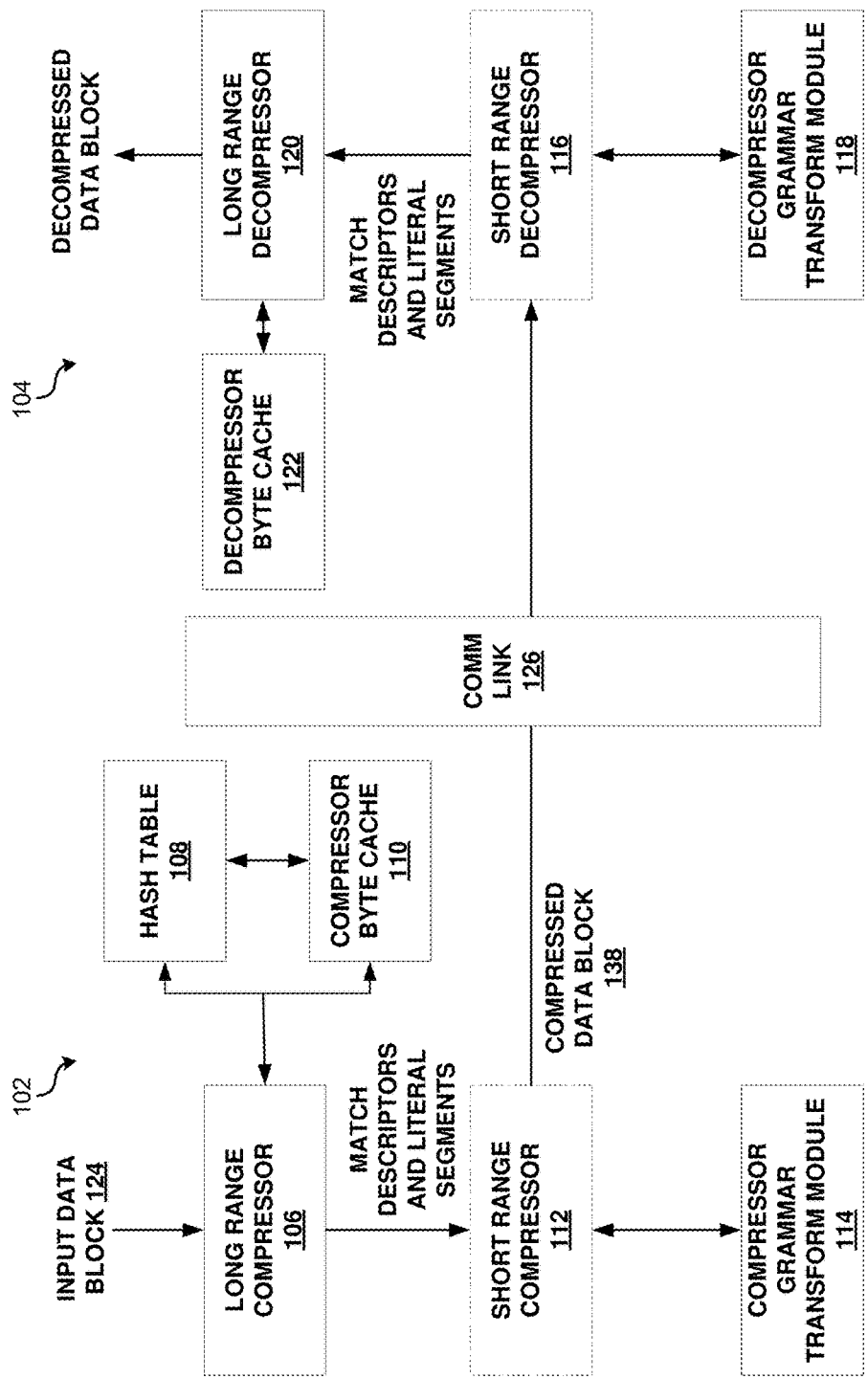
FIG. 1 is a block diagram illustrating an exemplary single-stream communication system in which the disclosed technology may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, conventional single stream long range compression techniques must be applied on a per-stream basis and not on the aggregate traffic. This conventional approach is inefficient as it requires dividing the available memory pool into fixed, smaller pools, each associated with one stream. This results in increased memory requirements and/or inefficient use of available memory resources, which adversely impacts compression performance. For example, a compression stream that, in practice, carries very little traffic (and thus makes very little use of its allocated memory) consumes that memory at the expense of a more heavily used stream. Consequently, compression of a more heavily used stream suffers from the resulting reduced memory and thus overall the compression suffers from the inefficient allocation of memory among the streams.

Although U.S. Patent Publication No. 2014/0223030 describes one method of applying multistream long range compression on multiple streams on an aggregated basis, as noted above, it has its problems. First, in order to handle out-of-order packets, it requires a byte cache extension, which requires a significant allocation of additional memory, which is a wasteful use of memory. Second, where packets are received out-of-order, decompression may malfunction if the different latency experienced by different compression schemes exceeds expectations. In order to protect against malfunction, such a compression and decompression scheme may require allocating double the memory or more to the decompressor.

Various embodiments of the disclosed technology address these problems arising in multistream networks through dynamic history multistream long range compression (DHC) techniques that may be applied to efficiently compress multiple, prioritized data streams received over a channel. Accordingly, the disclosed technology improves the functioning of computing modules used in these networks by providing improved DHC techniques.

In various implementations, a byte cache or history buffer is associated with each received stream, and a DHC compressor dynamically allocates fixed sized "history sections" to and from each history buffer. Accordingly, rather than having a static amount of memory available for each stream, the memory allocated to each stream may be allocated on a dynamic basis between streams. As the data traffic requirements increase or decrease for each stream, the total available memory may be efficiently allocated among the various streams.

In some embodiments, a DHC compressor makes stream history size adjustments prior to compressing a block of data and sends information identifying the change in history size to a DHC decompressor. In further embodiments, a DHC decompressor sends signaling information to the DHC compressor that is used to ensure that the DHC decompressor can operate with a fixed amount of total history memory (i.e., a fixed total number of history-sections across all the streams). In this manner, memory may be efficiently allocated to each stream to improve compression efficiency while ensuring that the decompressor can operate with a fixed amount of total memory.

As used herein, the term "long range compressor" generally refers to a first stage compressor that retains a "long range" of previously received bytes (e.g., last 10 MB, 100 MB, 1 GB, or larger) in an input byte stream for compression and captures macro redundancies in the input byte stream. For example, a current block of 1000 bytes of data may be compared with all of the stored data for any similar byte sequences (redundancies).

As used herein, the term "short range compressor" generally refers to a second stage compressor that retains a "short range" of previously received bytes in an input byte stream for compression and captures micro redundancies in the input byte stream. The short range compressor uses a smaller amount of received bytes to determine redundancies relative to a corresponding long range compressor. For example, a short range compressor may compare a current 4-byte sequence of data with all of the stored bytes for any similar byte sequences (redundancies).

As used herein, the term "stream" refers to a sequence of data blocks where the DHC compressor converts at least one uncompressed block into a compressed block and where the DHC decompressor receives a stream's compressed blocks in the same order in which they were compressed, but possibly with gaps from lost compressed blocks.

As used herein, the term "history section" refers to a fixed size block of memory where a given compression stream implements its history buffer using a set of one or more history sections.

As used herein, the term "data block" refers to a block of data that is compressed as a unit. The size of a data block is less than the size of a history section.

As used herein, the term "lossless channel" refers to a transport mechanism between the DHC compressor and DHC decompressor that ensures that all of a stream's blocks are delivered in the same order they were compressed to the DHC decompressor without any being damaged or lost. The order of blocks from different streams may be reordered provided an individual stream's blocks are not reordered.

As used herein, the term "lossy channel" refers to a transport mechanism between the DHC compressor and DHC decompressor that delivers an individual stream's undamaged blocks to the DHC decompressor in the same order that they were compressed, but possibly with gaps from lost compressed blocks. The order of blocks from different streams may be reordered provided that an individual stream's blocks are not reordered.

Before further describing the disclosed dynamic history multistream long range compression systems and methods, it is instructive to describe the operation of an exemplary single-stream long range compression system. FIG. 1 is a block diagram illustrating one such example of a single-stream long range compression communication system.

As illustrated in FIG. 1, the communication system includes a compression side 102 (e.g., a transmitter) and a decompression side 104 (e.g., a receiver). Compression side 102 transmits compressed data blocks to decompression side 104 via a communication link 126 having a reliable transport or link layer.

Compression side 102 includes a long range compressor 106, a hash table 108, a compressor byte cache 110, and an optional short range compressor 112. In this embodiment, short range compressor 112 is a grammar based compressor such as a YK compressor. Accordingly, compression side 102 includes a compressor grammar transform module 114. Alternatively, in other embodiments short range compressor 112 may be a V.44 compressor, LZ77 compressor, LZ78 compressor or other suitable compressor, and module 114 may be a short range dictionary or a history buffer instead of a grammar transform. In embodiments, one or more of these components can be implemented in digital form (e.g., as software running on a DSP or other processing device, with the addition of a DAC) and/or as digital hardware components including ASICs, FPGAs, etc.

Decompression side 104 includes an optional short range decompressor 116, a long range decompressor 120 and a decompressor byte cache 122. In this embodiment, short range decompressor 116 is a grammar based decompressor such as YK decompressor. Accordingly, decompression side 104 includes a decompressor grammar transform module 118. Alternatively, in other embodiments short range decompressor 116 may be a V.44 decompressor, LZ77 decompressor, LZ78 decompressor or other suitable decompressor and module 118 may be a short range dictionary or a history buffer instead of a grammar transform. In embodiments, one or more of these components can be implemented in digital form (e.g., as software running on a DSP or other processing device, with the addition of a DAC) and/or as digital hardware components including ASICs, FPGAs, etc.

Long range compressor 106 receives one stream of data blocks, including input data block 124. In embodiments, input data block 124 may vary in length, ranging from a few bytes to thousands of bytes, at a time. Input data block 124 may include IP blocks, web objects or any other blocks of data, which may be communicated over communication link 126. In embodiments, hash table 108 receives fingerprints computed by long range compressor 106. A hash function is used to map the fingerprint to its associated hash index. The hash index serves as an index to hash table 108, where the fingerprint and the metadata associated with that fingerprint value is stored. Hash table 108 may be implemented using any known data structure. Compressor byte cache 110 stores the previously received data blocks within the stream of data blocks, which is checked against input data block 124 for redundancy. The fingerprint metadata stored by the hash table 108 corresponds to the location of the fingerprint data window in compressor byte cache 110. In this embodiment, compressor byte cache 110 is implemented as a contiguous circular byte buffer scheme with wrap-around occurring only at block boundaries.

For example, assume that input data block 124 contains a segment of bytes, which had occurred in at least one previously received data block of the stream of data blocks. Using long range compressor 106, hash table 108 and compressor byte cache 110, a duplication of a segment of data (not necessarily the whole block) that had occurred earlier may be found. Long range compressor 106 extracts characteristic patterns of data, also called fingerprints, from input data block 124. A hash value is computed for each fingerprint. The computed hash value serves as an index to hash table 108, where the fingerprint and all the metadata associated with that fingerprint is stored. The metadata of the fingerprint is a location index to the compressor byte cache 110; it points to the location of the data (within compressor byte cache 110) from which the fingerprint had been computed. Metadata is used to map a fingerprint back to a byte sequence within compressor byte cache 110. Fingerprints are computed for each byte of incoming input data block 124. Based on a fingerprint selection process, most of the fingerprints are discarded and only few are stored. In one embodiment, fingerprints that have 'zero' in their last six least significant bits (LSB) are selected to be stored.

At a later time, if a fingerprint of input data block 124 matches with a fingerprint that is stored in hash table 108, it indicates that bytes of data of a previously received data block match bytes of data of input data block 124. In one embodiment, a fingerprint is computed over window size of data of 64 bytes. There could be a match of more than 64 bytes of data so the match region may be expanded to the left (less recently received bytes) and to the right (more recently received bytes). This will be described in greater detail below. Typically there could be thousands of matching bytes between a current data block and previous data blocks, contributing to long range compression. A valid match indicates that a segment of bytes in input data block 124 match with a segment of bytes stored in compressor byte cache 110. Once a valid match is found, long range compression of that segment of input data block 124 may be performed.

Long range compressor 106 encodes the matched segment as a match descriptor, which contains the information about the location of the matched segment of bytes within input data block 124 and length of the matched segment. The unmatched byte segments, called literal segments, are not compressed. Long range compressor 106 provides match descriptors and literal segments to short range compressor 112.

Short range compressor 112 is operable to compress short range duplications in input data block 124, where some byte patterns occur more frequently than others. In the example system of FIG. 1, a grammar-based compressor is used but any short range compression method may be used for second stage compression. Short range compressor 112 receives blocks that may include multiple match descriptors and literal segments. In one embodiment, short range compressor 112 is a more compact and structured form of dictionary based compressors. Dictionary based compressors look for patterns in the byte segments and are based on the assumption that certain phrases occur more often than others. As illustrated in this embodiment, short range compressor 112 communicates with compressor grammar transform module 114. The literal segment is parsed into a sequence of symbols in grammar transform module 114. Grammar within grammar transform module 114 is updated after each parsing.

Overall, the compression processing applied to input data block 124 may be determined adaptively. In embodiments, a given segment of input data block 124 may be processed by long range compressor 106 followed by short range compressor 112 or it may bypass long range compressor 106 and be directly compressed by short range compressor 112. Such processing may depend on (i) the contents of compressor byte cache 110 of long range compressor 106, (ii) the grammar state of short range compressor 112 and (iii) the length of the byte segment.

In embodiments, the design parameters of long range compressor 106 and short range compressor 112 may be optimized jointly such that the overall compressor provides the best trade-off between the compression gain and the resources needed for the implementation of the compression, i.e., the memory capacity (RAM) and the processing (CPU) power on both the transmitter and receiver ends of the network connection. The compression gain is maximized while the complexity (i.e., storage space and processing power) are held at reasonable levels.

Short range compressor 112 provides compressed data blocks 138, which are transmitted over communication link 126 and received by short range decompressor 116. In embodiments, communication link 126 provides a reliable transport or link layer to ensure that compressed data blocks 138 are delivered to short range decompressor 116 in the order of transmission and without errors or lost blocks. Short range decompressor 116 decompresses compressed data blocks 138 received over communication link 126 and reproduces data blocks consisting of the match descriptors and literal segments. In this example embodiment, a grammar-based decompressor is illustrated for short range decompression but any second order short range decompressor may be used. Short range decompressor 116 communicates with decompressor grammar transform module 118. Grammar on the decompressor side needs to be updated based on the information received over communication link 126 such that it is identical to the grammar on compression side 102, in order to achieve lossless decompression.

Long range decompressor 120 receives match descriptors and literal segments from short range decompressor 116 and reconstructs the input data block accordingly. It communicates with decompressor byte cache 122. Decompressor byte cache 122 needs to be updated based on the information received over communication link 126 such that it is identical to compressor byte cache 110 in order to prevent data loss. Long range decompressor 120 copies the matched byte segments from decompressor byte cache 122 based on the received match descriptors and literal segments. It places the decompressed blocks in the appropriate locations along with the literal segments to complete the construction of a decompressed block identical to the input block.

Figure 2:
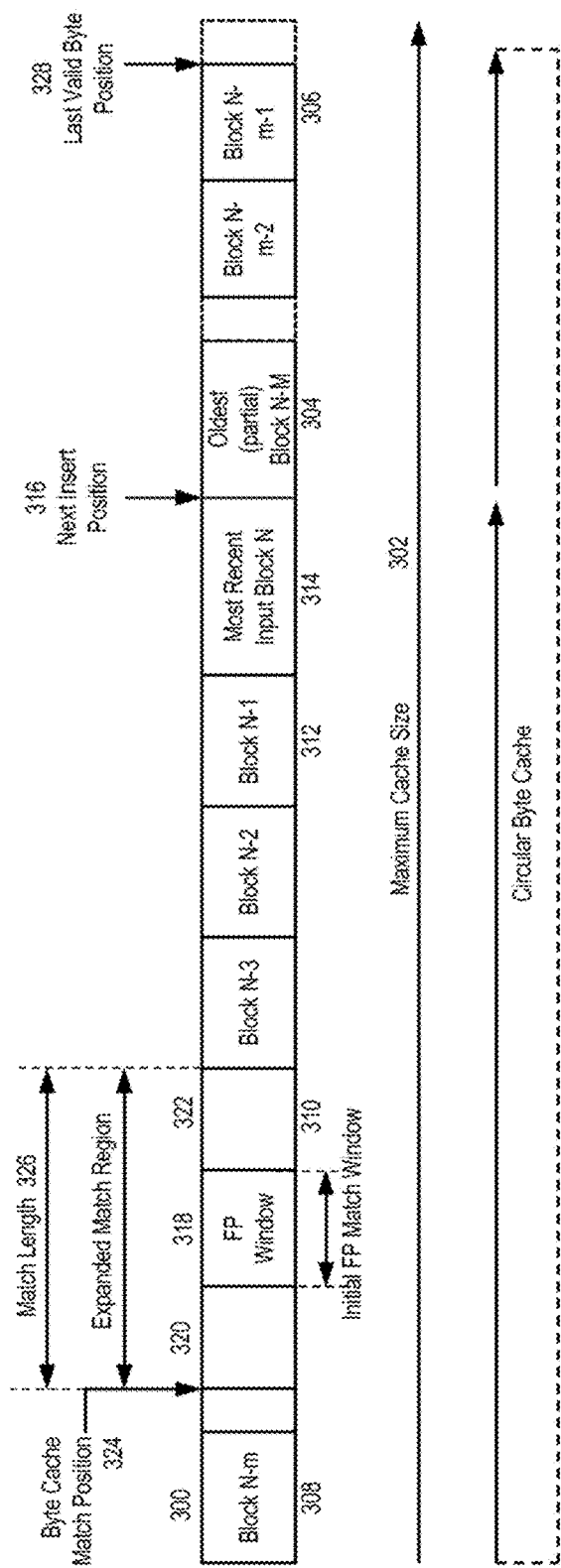
FIG. 2 illustrates an example circular byte cache that may be implemented by the compressor byte cache and decompressor byte cache of the single stream communication system of FIG. 1.

FIG. 2 illustrates an example circular byte cache 300 that may be implemented by compressor byte cache 110 and decompressor byte cache 122 of the single stream communication system of FIG. 1. As illustrated, circular byte cache 300, with a maximum cache size 302, includes a plurality of segments, including segments 304, 306, 308, 310, 312 and 314.

Segment 304 contains the oldest block in circular byte cache 300, which is about to be overwritten by the next block, indicated by a location 316. Segment 314 is the most recent block, which has been written in circular byte cache 300. Block 310 includes a region 318, a region 320 and a region 322. Region 318 corresponds to a fingerprint window of a cached fingerprint that matches a fingerprint in the current input block and that is detected. Accordingly, in this example, a consecutive string of data of the most recent input block, block 314, matches the consecutive string of data within region 318. As there is a match, the region is expanded beyond the initial window to the left (more recently received data) and to the right (less recently received data). Region 320 corresponds to an expansion window to the right while region 322 corresponds to an expansion window to the left. Once the total matching is determined, the byte cache match position within circular byte cache 300 is known. Byte cache offset 324 indicates the start of expanded match region that matches with a segment in the most recent input block, block 314, whereas the total match length is represented by double arrows 326.

In this embodiment, circular byte cache 300 is implemented as a contiguous circular byte buffer, with wrap around occurring only at block boundaries, instead of breaking up a block across cache boundaries. When a new input block is added to circular byte cache 300, it overwrites the oldest data in the cache. If an entire input block cannot fit at the end of circular byte cache 300, wrap-around occurs and the entire block is added at the start of circular byte cache 300. For example, if a new block is too big to fit between next insert position 316 and last valid byte position 328 then instead of splitting up the block across cache boundaries, it is added at the start of segment 308. Implementation of circular byte cache 300 as a contiguous circular byte buffer may considerably simplify cache management, expansion of match regions and verification of stale fingerprints. The simplicity provided for verification of fingerprints may also reduce the size of the fingerprint metadata that has to be stored, thereby reducing storage complexity. Contiguous storage also allows expansion of match regions across (cached) block boundaries, leading to longer matches and improved compression gain.

Implementation of circular byte cache 300 as a contiguous circular byte buffer, with wrap-around only at block boundaries, has a number of advantages over block based or generic circular buffer based schemes. The contiguous storage of bytes translates to less wasted storage space when compared to block based storage. Contiguous storage also allows expansion of match regions across (cached) block boundaries, which is not possible when caching is done in terms of blocks. Block based caching typically requires the use of an absolute linear block index in order to detect stale fingerprints. This type of indexing has two problems: (i) the index, which is several bytes long, needs to be stored as part of the fingerprint metadata, increasing storage complexity, and (ii) when the linear index ultimately wraps around, this event has to be detected and appropriate measures taken, which introduces complexity. In contrast, the contiguous circular byte buffer proposed here overcomes these problems, uses less storage space, is simpler to implement and also improves compression gain.

Along with the updating of compressor byte cache 110, hash table 108 is updated with the selected fingerprints for input data block 124 along with metadata. Note that the metadata corresponds to input data block 124 that was just inserted into compressor byte cache 110. Given a fingerprint value to be stored in hash table 108, a hash function is used to compute an index to a slot of hash table 108. An attempt is made to insert the fingerprint into the hash slot. Any matched fingerprint, regardless of whether its matching fingerprint was valid, stale or had a fingerprint collision, overwrites the existing metadata in the slot. This ensures that the hash table metadata entry for a fingerprint always points to the newest occurrence of a byte segment in compressor byte cache 110. An unmatched fingerprint is inserted successfully only if the slot is unoccupied or contains a stale fingerprint. Even if a large number of fingerprints fail to be inserted, it is not detrimental to performance as explained below.

As new data is inserted into compressor byte cache 110, it overwrites older data. However, hash table 108 may continue to hold the fingerprints that correspond to the overwritten data. Such stale fingerprints are only deleted on an as-needed basis; i.e., if a new fingerprint needs to be inserted into a slot occupied by a stale fingerprint. A stale fingerprint is detected by recomputing the fingerprint value using the data pointed to by the metadata. If the recomputed fingerprint does not match the stored fingerprint, it indicates that the fingerprint has become stale. i.e., the data from which it was computed has since been overwritten by newer input data. Such a stale fingerprint can be overwritten by the fingerprint going to be inserted. This approach of detection of stale fingerprint considerably reduces the amount of storage needed to hold the metadata and also simplifies the implementation of compressor byte cache 110 by avoiding the need for absolute indexing.

The degree to which hash insertion failures occur depends upon the loading factor of hash table 108 (i.e., the number of hash table slots divided by the number of byte cache fingerprints that have to be inserted into hash table 108) as well as the hash function used. It is desirable to keep the loading factor low to minimize the storage complexity of hash table 108. On the other hand, if this loading factor is too small, hash collisions occur, i.e., cases where a fingerprint cannot be inserted because its slot is occupied by a different fingerprint. If a fingerprint is not inserted, a potential duplication of the data within the fingerprint window cannot be detected, resulting in loss of compression gain. Therefore, design of hash table 108 is a tradeoff between storage complexity and performance. It is possible to alleviate this by using multiple hash functions. However, it was found that for the purposes of long range compression, it is possible to tolerate relatively high rates of hash collision and measures such as bucketed hashing and multiple hash functions were not critical. This occurs since the typical match region is much longer than a fingerprint window. Consequently a match region contributes a number of selected fingerprints. Even if some of the selected fingerprints fail to be inserted, as long as the other (even a single) fingerprint is successfully inserted, the entire match region will be detected. The key contributor is the expansion of match regions once a fingerprint match is found.

Figure 3:
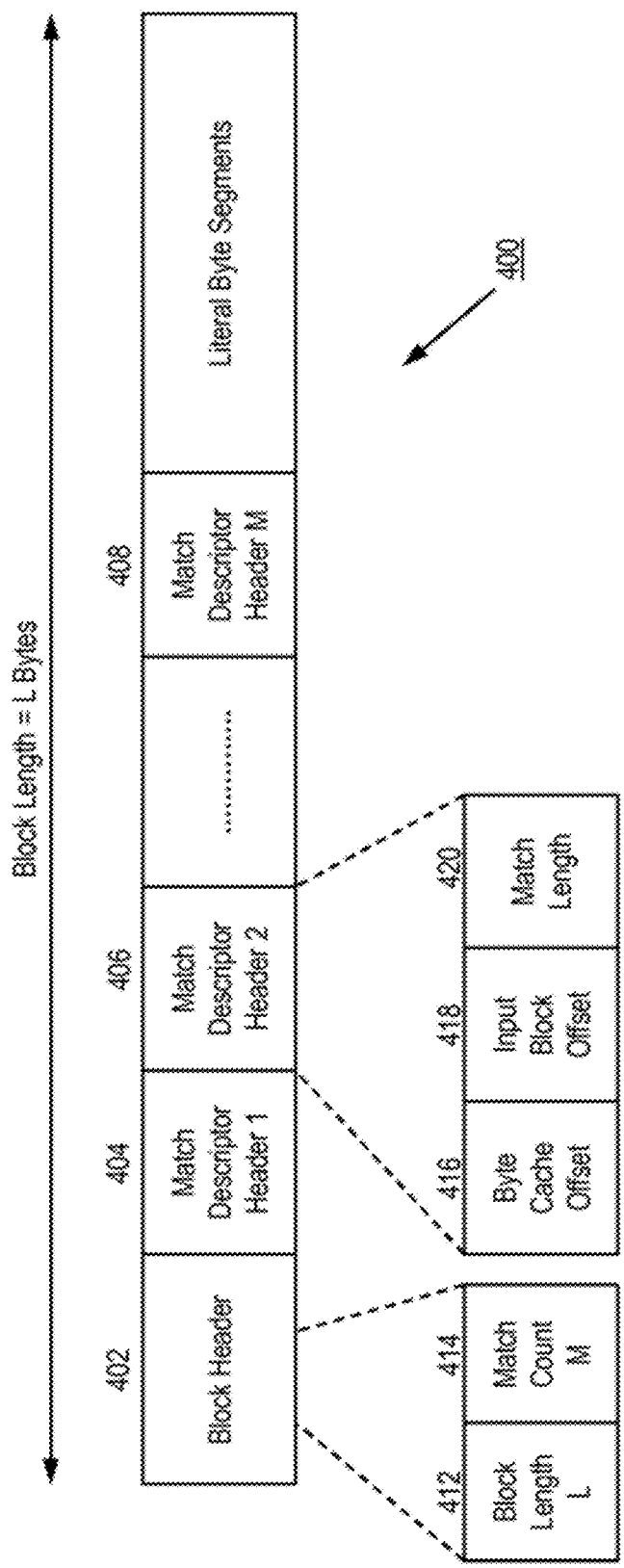
FIG. 3 illustrates an example long-range compressed block that may be created using the communication system of FIG. 1.

FIG. 3 illustrates an example long-range compressed block that may be created using the communication system of FIG. 1. As illustrated, long range compressed block 400 includes a block header field 402, a plurality of match descriptor header fields (examples shown as a match descriptor header field 404, a match descriptor header field 406, a match descriptor header field 408) and a literal byte segments field 410.

Block header field 402 further includes a block length field 412 and a match count field 414. Block length field 412 indicates total number of bytes in long range compressed block 400. Match count field 414 indicates total number of match segments that were found in input data block 124.

Each match descriptor header field includes a byte cache offset field, an input block offset field and a match length field. For example, match descriptor header field 406 includes a byte cache offset field 416, an input block offset field 418 and a match length field 420. Note that all match descriptor header fields 1, 2, . . . . , M have the same format as match descriptor header field 406, even though only match descriptor header field 406 is shown here in expanded form.

Byte cache offset field 416 corresponds to byte cache offset 324 of circular byte cache 300 of FIG. 3. In particular, byte cache offset field 416 indicates the offset location with respect to the beginning of compressor byte cache 110, where the match was found. Input block offset field 418 indicates the offset byte with respect to the beginning of input data block 124, where the match was found. Match length field 420 indicates the length of the matched segment in bytes.

Match count field 414 and match descriptor fields 416, 418 and 420 may be compressed using a variable length code. Each of these entities may be encoded using the 7 least significant bits of one or more bytes, with the most significant bits serving as "continuation bits." If the entity is small enough to be encoded using the 7 least significant bits of all the bytes so far used, the most significant bit is set to zero. Having the most significant bit set as a zero indicates that the byte is the last byte used in encoding the entity. Having the most significant bit set as a 1 means that the next byte was also used in encoding the entity and decoding should continue until a byte with 0 in its most significant is found. Match count, offsets and match lengths tend to be small values most of the time, but can occasionally take on large values. The variable length scheme provides significant savings in representing these values.

Figure 4:
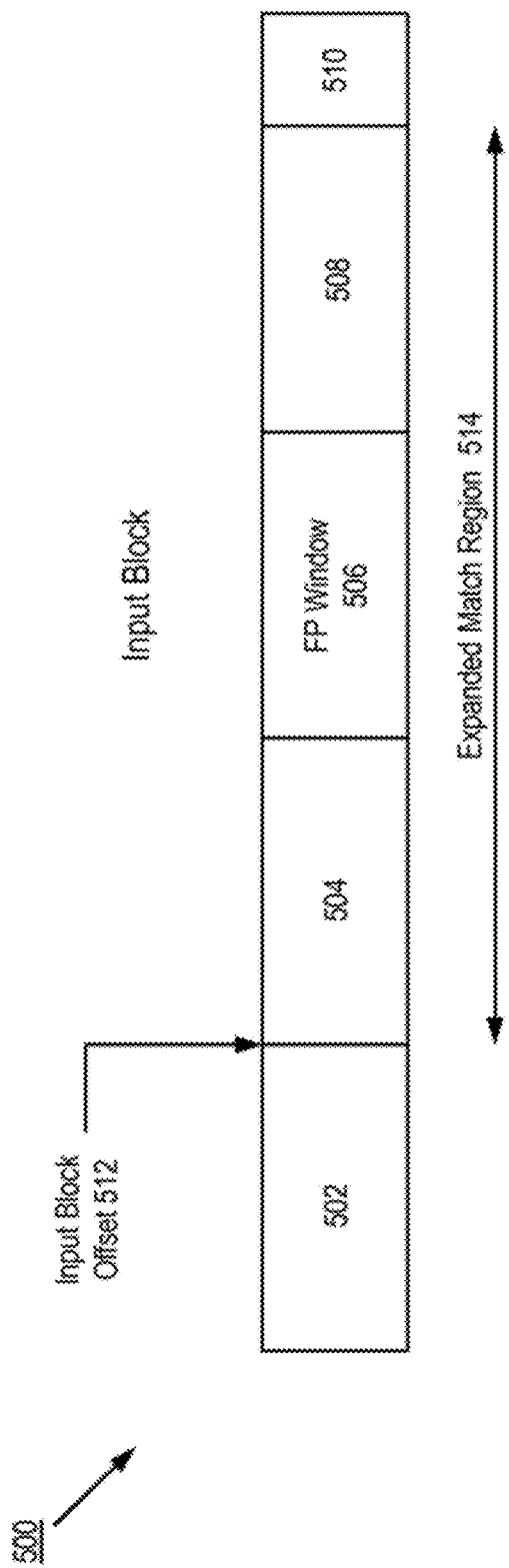
FIG. 4 illustrates an example embodiment of an input block where a match is found in accordance with the system of FIG. 1.

FIG. 4 illustrates an example embodiment of an input block 500 where a match is found in accordance with an embodiment. As illustrated, input block 500 includes a segment 502, a segment 504, a segment 506, a segment 508 and a segment 510. In one embodiment, an input block offset 512 indicates the start of segment 504, segment 506 indicates a fingerprint window and segments 504, 506 and 508 together mark the expanded match region equivalent to match length 420. Input block offset 512 corresponds to input block offset field 418 of long range compressed block 400 of FIG. 3. Segment 506 corresponds with region 318 of circular byte cache 300 of FIG. 3. Segment 506 was compared with a similar sized window from previous bytes and found to match. The match region, segment 506, was then extended in the left direction until there was no longer matching consecutive bits. This extended match region, segment 504, corresponds to region 320 of circular byte cache 300. The match region, segment 506, was additionally extended in the right direction until there was no longer matching consecutive bits. This extended match region, segment 508, corresponds to region 322 of circular byte cache 300 of FIG. 3.

There is a match in input block 500 starting at byte location 512 with a segment in a byte cache, where the match length corresponds to an expanded match region indicated by the double arrows 514. Additionally, a match descriptor header for each matched segment found in input data block 124 may be created. If no matched segment were found then there are no match descriptor headers and the match count field 414 is zero. Literal byte segments field 410 contains the unmatched bytes in input data block 124, in exactly the same order of occurrence in input data block 124. If all the bytes in the input data block 124 was matched to one or more segments in compressor byte cache 110, literal byte segments field 410 is empty, i.e., has zero bytes.

Figure 5:
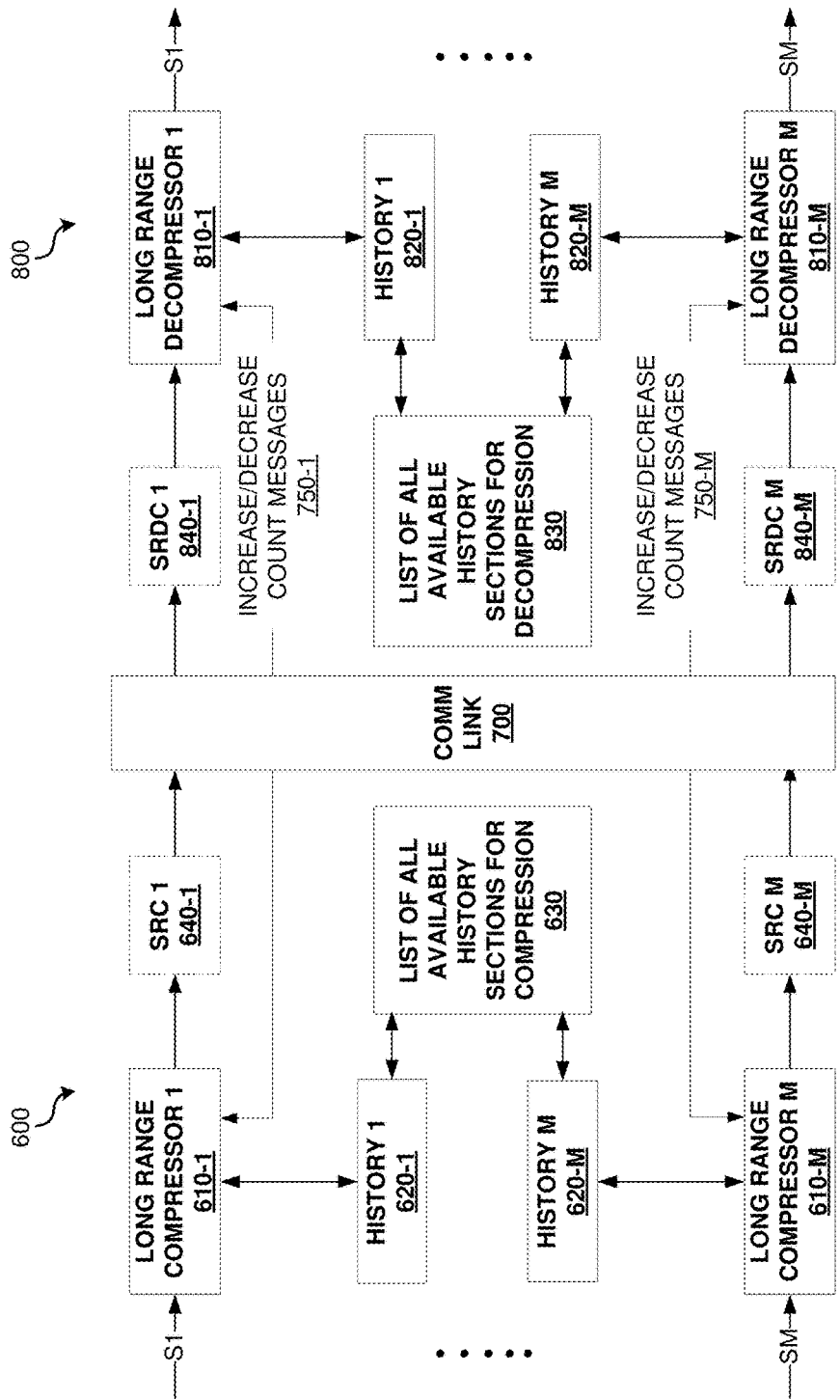
FIG. 5 is a block diagram illustrating a dynamic history multistream long range compression system that may be implemented in embodiments of the disclosed technology.

FIG. 5 is a block diagram illustrating a dynamic history multistream long range compression system that may be implemented in embodiments of the disclosed technology. As illustrated, a dynamic history multistream long range compressor (DHC compressor) receives a plurality of prioritized data streams $S_1$ to $S_M$ over a channel, compresses them, and transmits them to a DHC decompressor 800 over a communication link 700. In various embodiments, DHC compressor 600 may be implemented in a transmitter (e.g., as part of a server system) and DHC decompressor 800 may be implemented in a receiver (e.g., as part of a client device). In embodiments, communication link 700 may include a satellite link, a terrestrial wireless link or a terrestrial wired link. In particular embodiments, a suitable Internet Protocol (e.g., TCP or UDP) may be used to transmit internet data from compression side 600 to decompression side 800 (and vice-versa) across communication link 700.

In various embodiments, the prioritized traffic of streams $S_1$ to $S_M$ may not compressed in the same order that it is transmitted. For example, consider the case where diverse types of data received over a channel (e.g., voice (VoIP), streaming video, file transfer protocol (FTP), webpage requests, and other data) need to be transmitted from a transmitter to a receiver over communication link 700. Each type of data may be associated with particular quality of service (QoS) requirements. To address the QoS requirements, the different types of data may be prioritized into a number of traffic classes that are assigned to one of streams $S_1$ to $S_M$ for transmission. Because of prioritization of the traffic belonging to the different streams, packets belonging to different streams may not be transmitted in the same order that they are compressed. For example, consider the case where an FTP packet belonging to a low priority stream is compressed by the transmitter before a streaming video packet belonging to a higher priority stream. In this case, the receiver may receive the compressed streaming video packet before the compressed FTP packet, resulting in reordering of the packets.

As shown, DHC compressor 600 includes long range compressors 610-1 to 610-M configured to apply a first stage of compression to a respective data stream $S_1$ to $S_M$, history buffers or histories 620-1 to 620-M associated with each of the data streams, a list of all available history sections for compression 630, and optional short range compressors 640-1 to 640-M configured to apply a second stage of compression to a respective data stream $S_1$ to $S_M$. Although DHC compressor 600 is illustrated as having a particular arrangement of individual components in this particular example, it should be noted that the components may be integrated in one or more devices and additional components may be added. Additionally, one or more of these components can be implemented in digital form (e.g., as software running on a DSP or other processing device, with the addition of a DAC) and/or as digital hardware components including ASICs, FPGAs, etc.

During compression of data blocks, DHC compressor 600 dynamically allocates history sections to and from histories 620-1 to 620-M having a size of one or more history sections. In this manner, the amount of total available compression memory may be allocated between streams on a dynamic basis as the traffic for each stream increases and decreases. In embodiments, each of histories 620-1 to 620-M may be implemented as a circular byte cache illustrated by FIG. 2, a linear cache including a sequence of history sections, or other suitable cache structure.

The list of all available history sections for compression 630 may keep track of all available history sections, which history sections have been allocated to a stream, and which history sections are free and can be allocated to a stream if desirable. In embodiments, list 630 may be used to mark history sections as allocated when they become allocated, and to mark history sections as deallocated and available for a future allocation when they become deallocated.

As history sections are allocated to or deallocated from each stream, DHC compressor 600 notifies DHC decompressor 800 about changes to the history sizes of histories 620-1 to 620-M. In embodiments, further described below, these notifications may take place using signaling blocks or by tagging the transmitted compressed blocks with history size changes. In this manner, DHC decompressor 800 may allocate or deallocate history sections to corresponding histories 820-1 to 820-M and DHC compressor 600 may prevent DHC decompressor 800 from needing more than a fixed number of history sections. Accordingly, in environments where the different compression streams experience different latencies due to their different priority levels, decompression may take place without requiring DHC decompressor 800 to have a larger total cache than DHC compressor 600.

Figure 6:
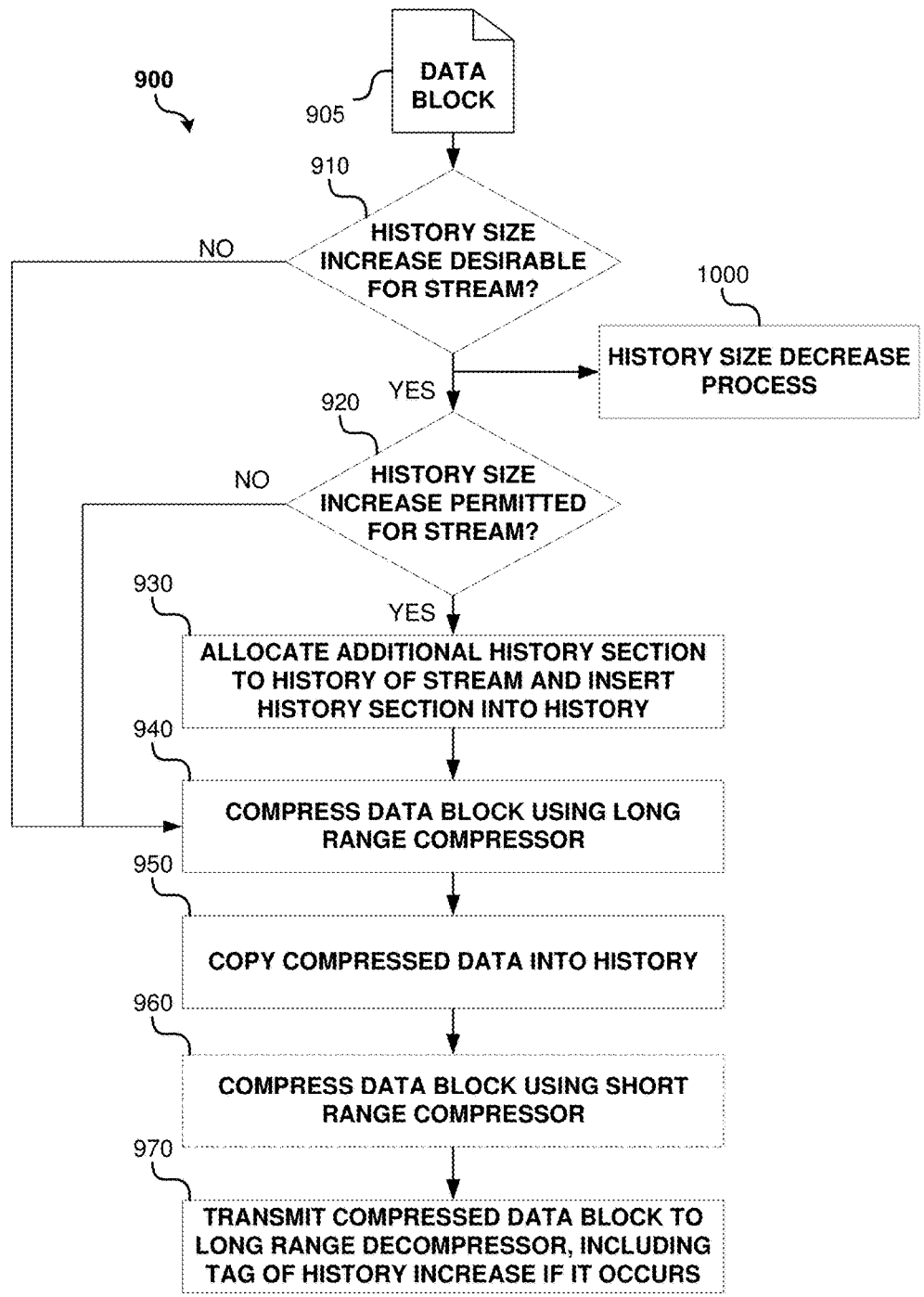
FIG. 6 is an operational flow diagram illustrating an example method that may be implemented by the DHC compressor of FIG. 5 to compress a data block and allocate or deallocate history sections.
Figure 7:
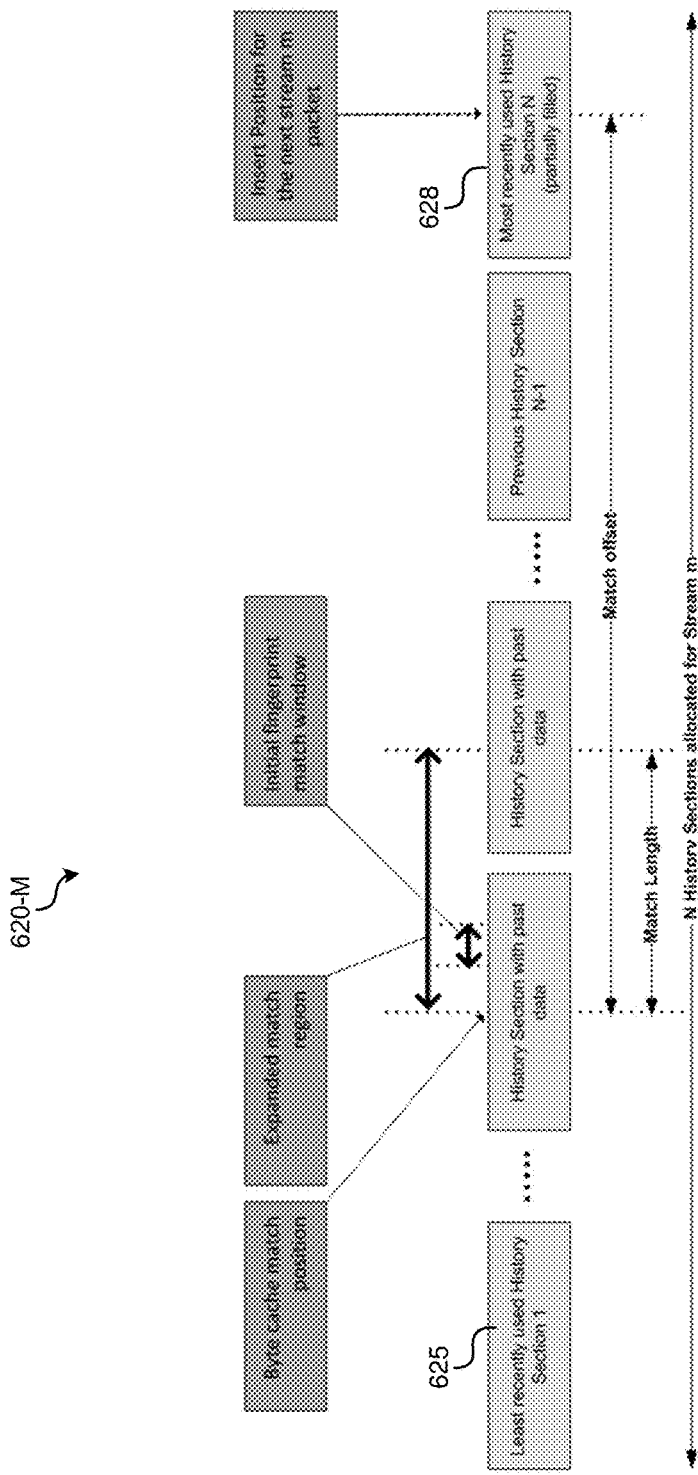
FIG. 7 illustrates an example history of a stream during compression of a data block.

FIG. 6 is an operational flow diagram illustrating an example method 900 that may be implemented by DHC compressor 600 to compress a data block and allocate or deallocate history sections. Method 900 will be described with reference to FIG. 7, which illustrates an example history or byte cache 620-M of a stream $S_M$ during compression of a data block. Method 700 will also be described with reference to Table 1, below, which is a non-limiting example of data structures that may be utilized to implement method 700 in a particular software implementation of DHC compressor 600.

TABLE 1

Example DHC Compressor Data Structures

| | |
|---|---|
| Array of single-stream long range compressors, one for each compression stream | Each long range compressor may comprise: A history (i.e., history buffer)-comprising: ordered set of fixed-size history-sections. Associated with each section is the 32-bit rollover-count of the first byte of history data stored in the section. Each stream starts with a single history-section. number of sections. a current section index. a 32-bit rollover-count of the number of bytes that the stream has compressed. a hash-table used to lookup locations in the history |
| Configuration Parameters | History-Section-Size: A configured history-section size. Maximum-History-Size: A configured maximum history size in units of history-sections. |

TABLE 1-continued

Example DHC Compressor Data Structures

| | |
|---|---|
| | Decrease-Threshold: A configured value which guides when a history decrease should take place in units of number of history-sections. |
| Increase-Count | A count of the number of history section increases granted since the start of compression. In embodiments, this value may be initialized to the number of streams when each stream starts with a single history-section. |
| Decompressor-Decrease-Count | A variable holding the maximum of all decompressor supplied history-section decrease counts. |

As illustrated by example Table 1, configurable parameters such as a fixed history section size and maximum history size (in units of number of history sections) may be set prior to implementation of method 900. Additionally, a configurable threshold value (in units of number of history sections) less than the maximum history size may determine when history section decreases take place. In embodiments, these configuration parameters may be varied by a user or automatically set by DHC compressor 600 based on considerations such as total available memory, compression speed, and the like.

With reference now to method 900, a data block 905 corresponding to a particular stream $S_M$ is received for compression. At decision 910, based on the received data block 905, DHC compressor 600 determines if it is desirable to increase the current size of the history 620-M of the stream. In embodiments, a history size increase is desirable for history 620-M if the received data block 905 would not fit (i.e., could not be stored) in the most recently used history section 628 without overwriting cached data. For example, if a data block does not fit in the most recently used history section 628, it is desirable to increase the current size of history 620-M. Conversely, if the received data block 905 fits in the most recently used history section 628, at decision 910 it may be determined that an increase to the current size of the history 620-M is not desirable because it is not needed. For example, consider the case where compression is initialized and each history 620-1 through 620-M, has one empty history section. In this example, because data block 905 fits in the one empty history section of 620-M, at decision 910 it may be determined that a history size increase is not desirable.

Assuming a history size increase is desirable for the stream, DHC compressor 600 may perform a history size decrease operation 1000, further described below, to determine if a history section should be deallocated from a stream. Additionally, at decision 920 it is determined if a history size increase is permitted. In various embodiments, a history size increase is permitted if the total history size of DHC decompressor 800 (i.e., number of history sections allocated across all streams) would not exceed a predetermined threshold with the history size increase. For example, with reference to the example implementation of Table 1, a history size increase is permitted when the (Increase-Count− the DHC decompressor-Decrease-Count)<Maximum-History-Size. In other words, a history size increase is permitted when the configured maximum history size is greater than the difference between a count of the number of history section increases granted since the start of compression and the maximum of all decompressor supplied history-section decrease counts.

In various embodiments, DHC compressor 600 keeps track of the total history size of DHC decompressor by receiving signaling blocks (e.g., history-section count messages 750-M) from DHC decompressor 800. For example, in the implementation of Table 1, DHC compressor 600 keeps track of decompressor supplied history-section decrease counts (DHC Decompressor-Decrease-Count variable) by receiving Decompressor Decrease signaling blocks from DHC Decompressor 800. Upon receiving a Decompressor Decrease signaling block, DHC Compressor 600 updates its Decompressor-Decrease-Count variable. In embodiments, The DHC decompressor-Decrease-Count variable counts the total number of decreases (without rollover) since the beginning of compression. As would be understood by one having skill in the art, the value sent by Decompressor could be a roll-over counter and the full, without-rollover count can be restored from the roll-over counter and the previous restored value. In this implementation, the DHC compressor 600 keeps the maximum of the restored without-rollover values in the DHC decompressor-Decrease-Count variable.

Assuming a history size increase is permitted and desirable, at operation 930 DHC compressor 600 allocates and inserts an additional history section into history 620-M. In preferred embodiments, the additional history section is inserted in the stream's ordered set of history sections after the current section, thereby extending history 620-M. For example, with reference to FIG. 7, the additional history section may be inserted after most recently used history section 628, thereby extending the history size of history 620-M from size N to size N+1 history sections. If a history size increase is not desirable or permitted, operation 930 is not performed for received data block 905.

At operation 940, DHC compressor 600 long range compresses the data block using a long range compressor 610-M associated with the stream $S_M$. In various implementations, the long range compression for the stream may be based on any single stream long range compression algorithm known in the art. For example, operation 940 may follow the long range compression method described above with respect to the single stream long range compression system of FIGS. 1-4. Other examples of single stream long range compression algorithms are described in U.S. Patent Application Publication No. 20140223030, which is incorporated herein by reference in its entirety.

At operation 950, the long range compressed data block may be copied into history 620-M. During compressions where the history size of the stream is increased at operation 930, the DHC compressor 600 may copy the compressed data block into the added history section. During compressions where the history size of the stream is not increased, DHC compressor 600 may, depending upon the available space in history 620-M, skip operation 950, copy the compressed data block into the mostly recently used history section 628 (e.g., if there is enough space), or overwrite compressed data if there is not enough space in section 628. In embodiments where compressed data is overwritten, it is preferable that the oldest compressed data in the least recently used history section 625 is overwritten first.

In embodiments where short range compressors are used in DHC compressor 600, at optional operation 960 DHC compressor 600 may perform a second stage of compression on long range compressed data block 905 using a short range compressor 640-M associated with the stream $S_M$. In various embodiments, the short range compression may be based on any single stream short range compression algorithm known in the art. For example, the short range compression may be based on a grammar-based algorithm such as the one described above with respect to the single stream long range compression system of FIGS. 1-4. Other examples of single stream short range compression algorithms are described in U.S. Patent Application Publication No. 20140223030.

At operation 970, the compressed data block is transmitted from DHC compressor 600 to DHC decompressor 800 using communication link 700. If the history section size of the stream was increased during compression, the compressed data block may be tagged as having a history increase prior to transmission. Alternatively, in other embodiments DHC compressor 600 may transmit a signaling count message 750-M to DHC decompressor 800 indicating the history increase.

Figure 8:
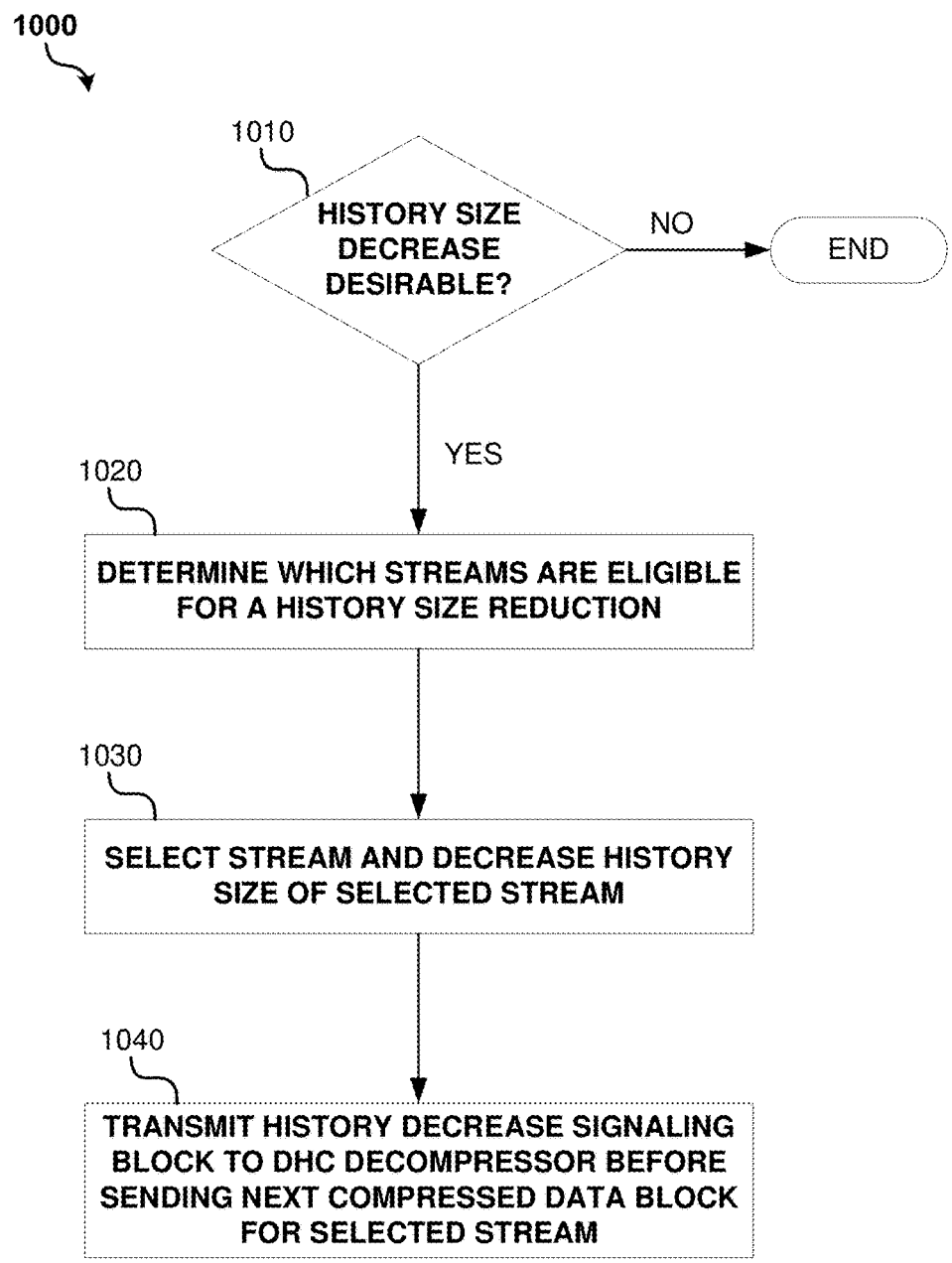
FIG. 8 is an operational flow diagram illustrating a history size decrease process that may be implemented by the DHC compressor of FIG. 5.

FIG. 8 is an operational flow diagram illustrating a history size decrease process 1000 that may be performed by DHC compressor 600 in embodiments. In implementations, process 1000 may be performed after determining that a history size increase is desirable for a data block that is currently being compressed.

At decision 1010, it is determined whether a history size decrease is desirable. In various embodiments, the desirability of a history size decrease is based on the delay between when DHC compressor 600 does a history size decrease and when DHC compressor 600 learns from DHC decompressor 800 that it too has performed a history size decrease. For example, with reference to the example implementation of Table 1, a history size decrease is desirable when (Maximum-History-Size−(Increase-Count−the DHC decompressor-Decrease-Count))<Decrease-Threshold. In this implementation the Decrease-Threshold parameter identifies the number of history sections that are set aside to compensate for the delay between when the DHC compressor does a decrease and when the DHC compressor learns from the DHC decompressor that it too has performed a decrease. In embodiments, this takes place after any potential increase.

If a history size decrease is desirable, at operation 1020 it is determined which streams are eligible for a history size reduction. In preferred embodiments, streams that have histories with more than one history section are eligible for a reduction in history size. Assuming there are one or more streams eligible for a reduction in history size, at operation 1030 a stream is selected and its history size is reduced by removing a history section. In preferred embodiments, DHC compressor 600 selects the stream that has the least-recently compressed block of data and decreases that stream's history size by deallocating the least recently used history section in that stream's history. Following deallocation of a history section from a stream, at operation 1040 a history decrease signaling block (e.g., message 750-M) is sent to DHC decompressor 800 before sending the next compressed block for the data stream that was deallocated a history section.

With reference again to FIG. 5, DHC decompressor includes long range decompressors 810-1 to 810-M configured to apply a first stage of decompression to a compressed data block corresponding to one of data stream $S_1$ to $S_M$, history buffers or histories 820-1 to 820-M associated with each of the data streams, a list of all available history sections for decompression 830, and optional short range decompressors 840-1 to 840-M configured to apply a second stage of decompression. Although DHC decompressor 800 is illustrated as having a particular arrangement of individual components in this particular example, it should be noted that the components may be integrated in one or more devices and additional components may be added. Additionally, one or more of these components can be implemented in digital form (e.g., as software running on a DSP or other processing device, with the addition of a DAC) and/or as digital hardware components including ASICs, FPGAs, etc.

The list of all available history sections for decompression 830 may keep track of all available history sections, which history sections have been allocated to a stream, and which history sections are free and can be allocated to a stream if desirable. In embodiments, list 830 may be used to mark history sections as allocated when they become allocated, and to mark history sections as deallocated and available for a future allocation when they become deallocated.

Figure 9:
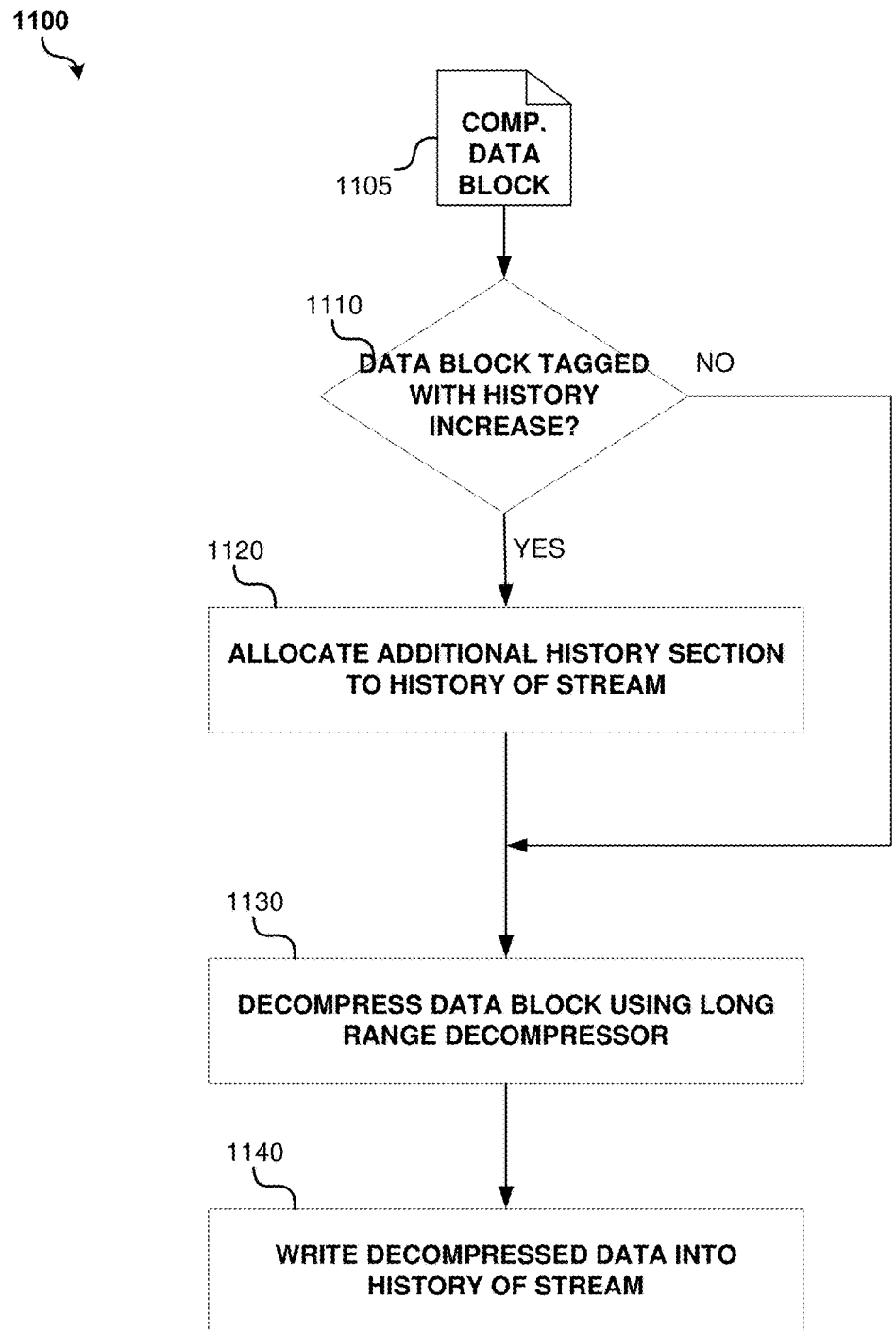
FIG. 9 is an operational flow diagram illustrating an example method that may be implemented by the DHC decompressor of FIG. 5 to decompress a received compressed data block and allocate history sections.

FIG. 9 is an operational flow diagram illustrating an example method 1100 that may be implemented by DHC decompressor 800 to decompress a received compressed data block and allocate history sections to its histories 820-1 to 820-M. Method 1100 will be described with reference to Table 2, below, which is a non-limiting example of data structures that may be utilized to implement method 1100 in a particular software implementation of DHC decompressor 800.

TABLE 2

Example DHC Decompressor Data Structures

| | |
|---|---|
| Array of single-stream long range decompressors, one for each compression stream | Each long range decompressor may comprise: A history (i.e., history buffer)-comprising: ordered set of fixed-size history-sections. Associated with each section is the 32-bit rollover-count of the first byte of history data stored in the section. Each stream starts with a single history-section. number of sections. a current section index. a 32-bit rollover-count of the number of bytes that the stream has compressed. |
| History-Section-Size | A configured history-section size. |
| Decrease-Count | A variable holding the number of Stream-History-Decrease signaling blocks received from the DHC compressor. |

At decision 1110 it is determined whether the compressed data block 1105 is tagged with a history size increase. If so, at operation 1120, an additional history section is allocated to and inserted into a history 820-M associated with the stream. In embodiments, the additional history section may be inserted in the ordered set of history sections of history 820-M after the most recently used history section.

At operation 1130, the compressed data block is decompressed using the single-stream long decompressor 810-M associated with the stream. In various implementations, the long range decompression for the stream may be based on any single stream long range decompression algorithm known in the art. For example, operation 1130 may follow the long range decompression method described above with respect to the single stream long range compression/decompression system of FIGS. 1-4. Other examples of single stream long range decompression algorithms are described in U.S. Patent Application Publication No. 20140223030.

At operation 1140, the decompressed data block is written into the history 820-M of the stream. In embodiments where an additional history section was allocated to history 820-M, the decompressed data block may be written into the added history section. Alternatively in embodiments where an additional history section was not allocated to history 820-M (e.g., data block was not tagged with a history size increase), the decompressed data block is written into the existing unextended history. For example, the decompressed data may be written into the most recent history section (if there is space available) or used to overwrite the data in the least recently used history section.

In additional embodiments of method 1100, a second stage decompression of the data block may be applied using a single-stream short range decompressor 840-M associated with the stream of the data block. In various embodiments, the short range decompression may be based on any single stream short range decompression algorithm known in the art. For example the short range decompression may be based on a grammar-based algorithm such as the one described above with respect to the single stream long range compression/decompression system of FIGS. 1-4. Other examples of single stream short range decompression algorithms are described in U.S. Patent Application Publication No. 20140223030.

Figure 10:
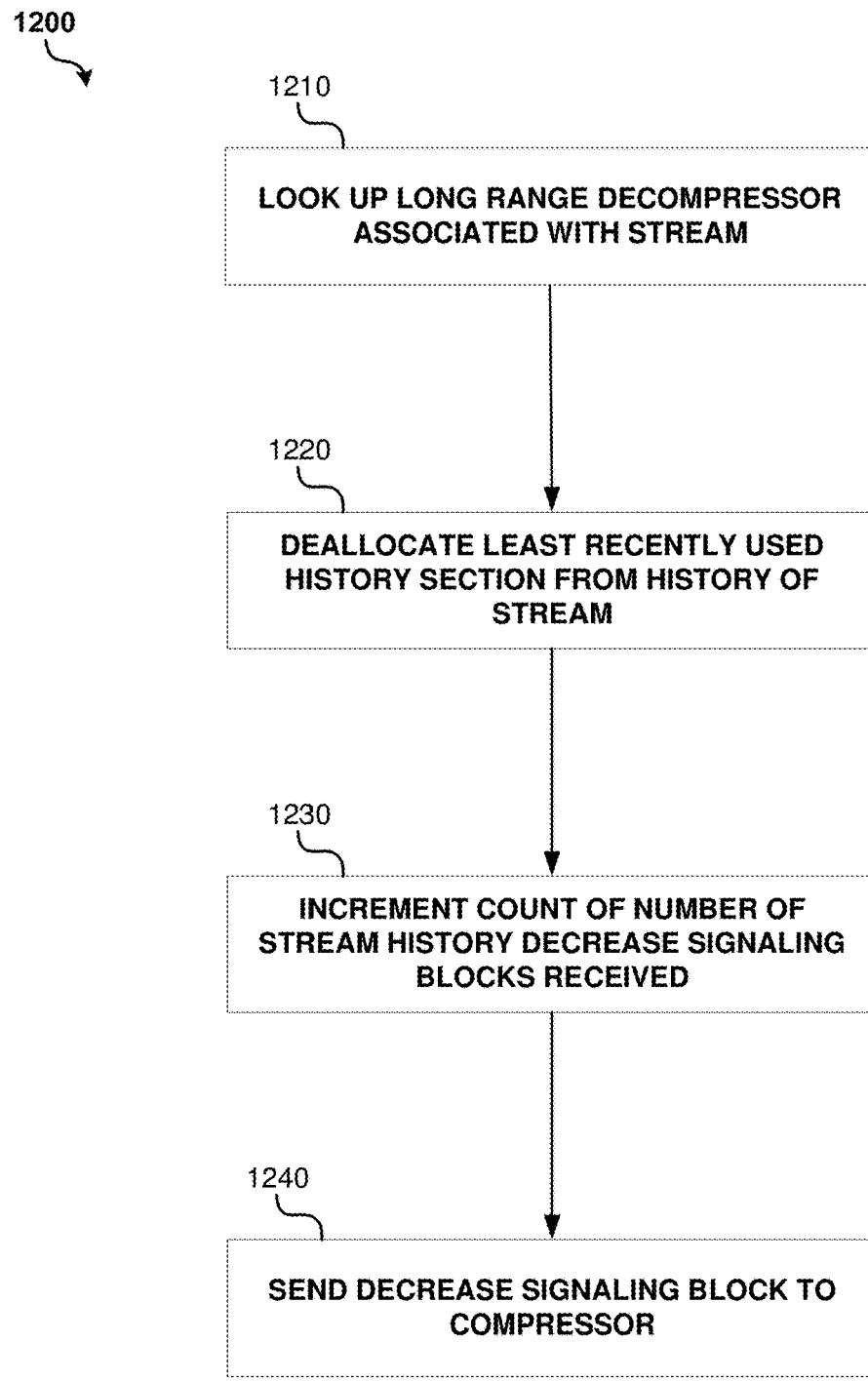
FIG. 10 is an operational flow diagram illustrating an example method that may be implemented by the DHC decompressor of FIG. 5 to deallocate history sections from a history in response to receiving a stream history decrease signaling message from a DHC compressor.

FIG. 10 is an operational flow diagram illustrating an example method 1200 that may be implemented by DHC decompressor 800 to deallocate history sections from a history 820-M in response to receiving a stream history decrease signaling block or message 750-M from DHC compressor 600.

At operation 1210, in response to receiving a stream history decrease signaling block, DHC compressor 800 looks up the long range decompressor 810-M associated with the stream. At operation 1220, a history section is deallocated from the history 820-M of the stream. In preferred embodiments, the history is deallocated from the least recently used history section of history 820-M (i.e., the history section that has least-recently had data stored in it).

At operation 1230, a count of the total number of received stream history decrease signaling blocks is incremented. For example, with reference to Table 2, the variable Decrease-Count is incremented. At operation 1240, DHC decompressor 800 sends to DHC compressor 600 a decompressor decrease signaling block that includes the updated count determined at operation 1230. In various embodiments, the signaling block with the updated count is sent at an opportune time. For example, the signaling block may be transmitted attached to the next block being compressed and sent in the return direction. As another example, the signaling block could be sent after a timeout, thereby allowing multiple decrease count changes to be carried by a single signaling block. In embodiments, the decrease count signaling blocks are sent to DHC compressor 600 by a channel that guarantees delivery of the most recently sent block. In this manner the blocks may be sent in any order provided they do not arrive so far out-of-order that the restoration of a full, without-rollover count can be performed by the DHC compressor.

In embodiments, the DHC compression system of FIG. 5 may be configured to operate in a lossy channel mode. In these embodiments, each of the single-stream long range compressors 610-1 through 610-M and long range decompressors 810-1 through 810-M may operate in a lossy channel mode as follows. First, during compression of data blocks (i.e., implementation of method 900), a single-stream long compressor 610-M may append a sequence number to the compressed data block prior to transmission step 970. Second, after decompression of data blocks (i.e., implementation of method 1100), a single-stream long range decompressor 810-M may send back an acknowledgement message or signaling block, preferably using a reliable communication channel.

In one particular embodiment, the acknowledgement messages may indicate what portions of the history section (e.g., all of it, the first N bytes, etc.) the DHC compressor can rely upon for future compression. In this particular embodiment, one acknowledgement message may be sent per history section of a stream when data is first processed for a subsequent history section of the stream. Alternatively, in other embodiments other methods of sending acknowledgement methods known in the art (e.g., grouping multiple data acknowledgement messages together) may be used.

In further embodiments of lossy channel operation, DHC decompressor 800 sends decompressor decrease signaling blocks or messages via a reliable channel, for example, to recover from lossy-channel signaling block loss. In preferred implementations of these embodiments, the most up to date decrease count may be sent with each transmission or retransmission of a decompressor decrease signaling block.

In yet further embodiments of lossy channel operation, DHC compressor 600 may send a roll-over count of the number of history-section increases a stream has experienced along with each compressed block in place of the tagging of single history section increases sent with a block. This may allow DHC decompressor 800 to detect increases and to insert additional history sections as needed.

Figure 11:
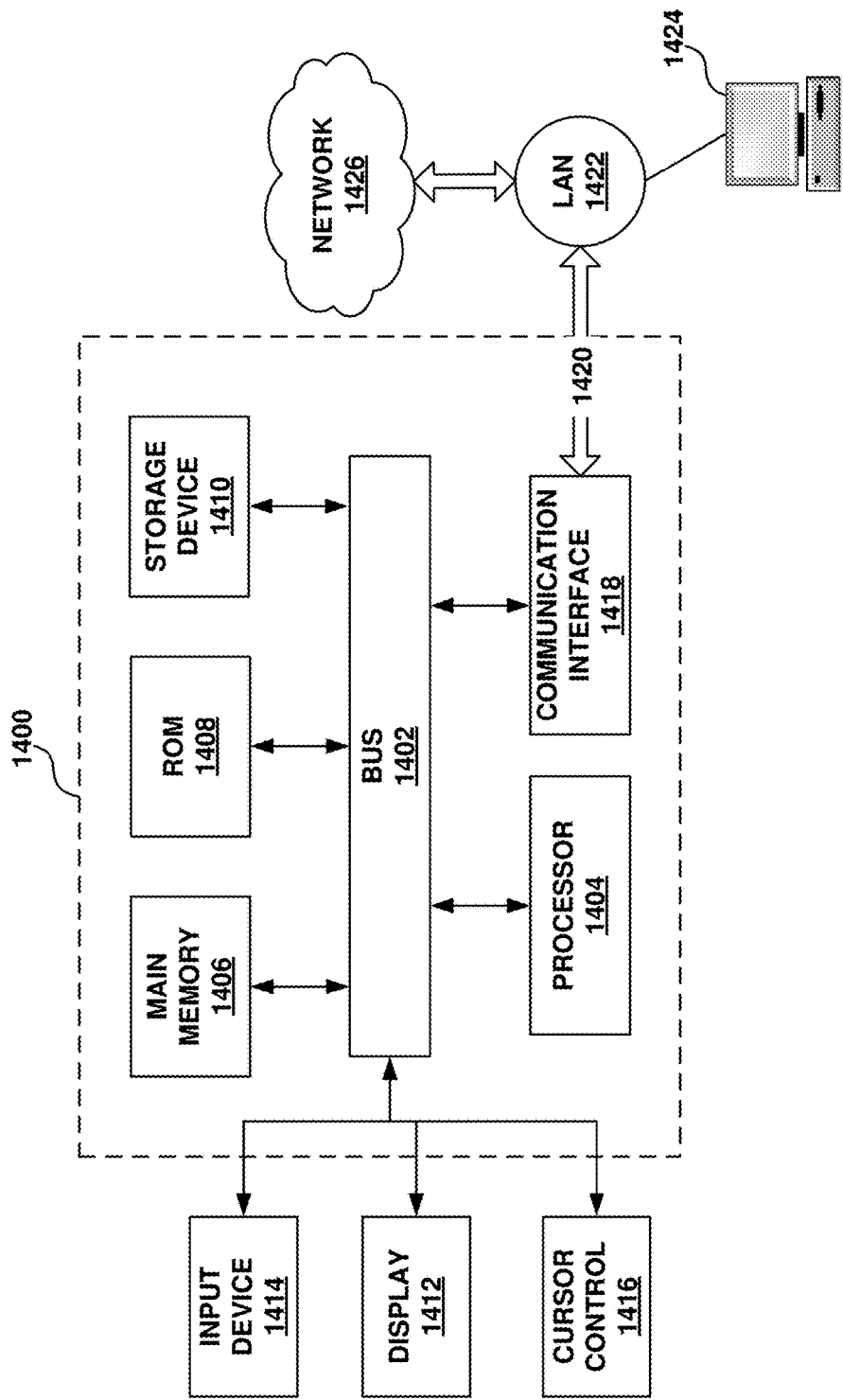
FIG. 11 illustrates an example computing module that may be used in implementing features of various embodiments.

FIG. 11 illustrates a computer system 1400 upon which example embodiments according to the present disclosure can be implemented. Computer system 1400 can include a bus 1402 or other communication mechanism for communicating information, and a processor 1404 coupled to bus 1402 for processing information. Computer system 1400 may also include main memory 1406, such as a random access memory (RAM) or other dynamic storage device, coupled to bus 1402 for storing information and instructions to be executed by processor 1404. Main memory 1406 can also be used for storing temporary variables or other intermediate information during execution of instructions to be executed by processor 1404. Computer system 1400 may further include a read only memory (ROM) 1408 or other static storage device coupled to bus 1402 for storing static information and instructions for processor 1404. A storage device 1410, such as a magnetic disk or optical disk, may additionally be coupled to bus 1402 for storing information and instructions.

Computer system 1400 can be coupled via bus 1402 to a display 1412, such as a cathode ray tube (CRT), liquid crystal display (LCD), active matrix display, light emitting diode (LED)/organic LED (OLED) display, digital light processing (DLP) display, or plasma display, for displaying information to a computer user. An input device 1414, such as a keyboard including alphanumeric and other keys, may be coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412.

According to one embodiment of the disclosure, dynamic history multistream long range compression, in accordance with example embodiments, is provided by computer system 1400 in response to processor 1404 executing an arrangement of instructions contained in main memory 1406. Such instructions can be read into main memory 1406 from another computer-readable medium, such as storage device 1410. Execution of the arrangement of instructions contained in main memory 1406 causes processor 1404 to perform one or more processes described herein. One or more processors in a multi-processing arrangement may also be employed to execute the instructions contained in main memory 1406. In alternative embodiments, hard-wired circuitry is used in place of or in combination with software instructions to implement various embodiments. Thus, embodiments described in the present disclosure are not limited to any specific combination of hardware circuitry and software.

Computer system 1400 may also include a communication interface 1418 coupled to bus 1402. Communication interface 1418 can provide a two-way data communication coupling to a network link 1420 connected to a local network 1422. By way of example, communication interface 1418 may be a digital subscriber line (DSL) card or modem, an integrated services digital network (ISDN) card, a cable modem, or a telephone modem to provide a data communication connection to a corresponding type of telephone line. As another example, communication interface 1418 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1418 sends and receives electrical, electromagnetic, or optical signals that carry digital data streams representing various types of information. Further, communication interface 1418 may include peripheral interface devices, such as a Universal Serial Bus (USB) interface, a PCMCIA (Personal Computer Memory Card International Association) interface, etc.

Network link 1420 typically provides data communication through one or more networks to other data devices. By way of example, network link 1420 can provide a connection through local network 1422 to a host computer 1424, which has connectivity to a network 1426 (e.g. a wide area network (WAN) or the global packet data communication network now commonly referred to as the "Internet") or to data equipment operated by service provider. Local network 1422 and network 1426 may both use electrical, electromagnetic, or optical signals to convey information and instructions. The signals through the various networks and the signals on network link 1420 and through communication interface 1418, which communicate digital data with computer system 1400, are example forms of carrier waves bearing the information and instructions.

Computer system 1400 may send messages and receive data, including program code, through the network(s), network link 1420, and communication interface 1418. In the Internet example, a server (not shown) might transmit requested code belonging to an application program for implementing an embodiment of the present disclosure through network 1426, local network 1422 and communication interface 1418. Processor 1404 executes the transmitted code while being received and/or store the code in storage device 1410, or other non-volatile storage for later execution. In this manner, computer system 1400 obtains application code in the form of a carrier wave.

The term "computer-readable medium" as used herein refers to any medium that participates in providing instructions to processor 1404 for execution. Such a medium may take many forms, including but not limited to non-volatile media, volatile media, and transmission media. Non-volatile media include, for example, optical or magnetic disks, such as storage device 1410. Volatile media may include dynamic memory, such as main memory 1406. Transmission media may include coaxial cables, copper wire and fiber optics, including the wires that comprise bus 1402. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Figure 12:
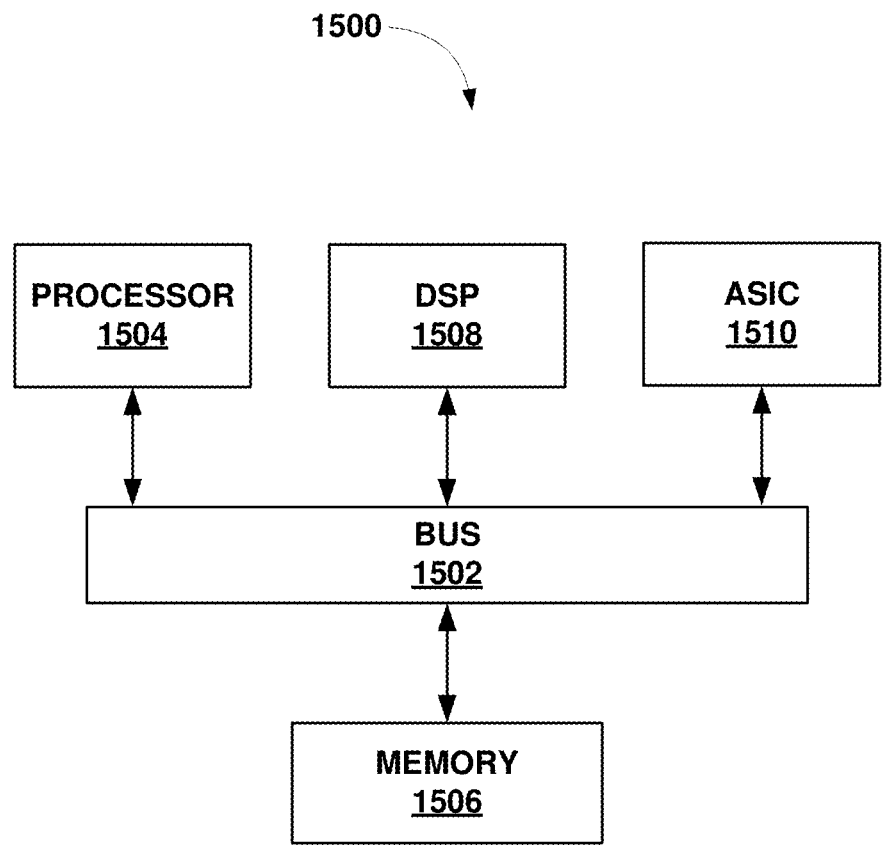
FIG. 12 illustrates an example chip set that can be utilized in implementing dynamic history multistream long compression in accordance with various embodiments.

FIG. 12 illustrates a chip set 1500 in which embodiments of the disclosure may be implemented. Chip set 1500 can include, for instance, processor and memory components described with respect to FIG. 11 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, chip set 1500 includes a communication mechanism such as a bus 1002 for passing information among the components of the chip set 1500. A processor 1504 has connectivity to bus 1502 to execute instructions and process information stored in a memory 1506. Processor 1504 includes one or more processing cores with each core configured to perform independently. A multi-core processor enables multiprocessing within a single physical package. Examples of a multi-core processor include two, four, eight, or greater numbers of processing cores. Alternatively or in addition, processor 1504 includes one or more microprocessors configured in tandem via bus 1502 to enable independent execution of instructions, pipelining, and multithreading. Processor 1504 may also be accompanied with one or more specialized components to perform certain processing functions and tasks such as one or more digital signal processors (DSP) 1508, and/or one or more application-specific integrated circuits (ASIC) 1510. DSP 1508 can typically be configured to process real-world signals (e.g., sound) in real time independently of processor 1504. Similarly, ASIC 1510 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

Processor 1504 and accompanying components have connectivity to the memory 1506 via bus 1502. Memory 1506 includes both dynamic memory (e.g., RAM) and static memory (e.g., ROM) for storing executable instructions that, when executed by processor 1504, DSP 1508, and/or ASIC 1510, perform the process of example embodiments as described herein. Memory 1506 also stores the data associated with or generated by the execution of the process.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 11. Various embodiments are described in terms of this example-computing module 1400. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for compressing data blocks associated with a plurality of prioritized data streams, the method comprising:
    receiving a data block associated with a first data stream of the plurality of prioritized data streams, wherein each of the plurality of prioritized data streams is associated with a history buffer comprising one or more allocated history sections;
    determining if a history size increase is permitted for the history buffer of the first data stream based on a count of a number of history size increases previously granted to the plurality of prioritized data streams, wherein a history size increase is permitted for the history buffer of the first data stream if a predetermined maximum history size is greater than a difference between the count of the number of history size increases previously granted and a maximum of all history section decrease counts received from a decompressor; and
    compressing the data block using a long range compressor associated with the first data stream.

2. The method of claim 1, further comprising:
    determining that a history size increase is permitted for the history buffer of the first data stream;
    in response to determining that a history size increase is permitted, allocating an additional history section to the history buffer of the first data stream; and
    inserting the allocated additional history section into the history buffer of the first data stream.

3. The method of claim 1, further comprising: determining if a history size increase is desirable for the history buffer of the first data stream based on a determination of whether the received data block would fit in a most recently used history section of the history buffer of the first data stream.

4. A method for compressing data blocks associated with a plurality of prioritized data streams, the method comprising:
    receiving a data block associated with a first data stream of the plurality of prioritized data streams, wherein each of the plurality of prioritized data streams is associated with a history buffer comprising one or more allocated history sections;
    determining if a history size increase is permitted for the history buffer of the first data stream based on a count of a number of history size increases previously granted to the plurality of prioritized data streams;
    compressing the data block using a long range compressor associated with the first data stream;
    insert an allocated additional history section into the history buffer of the first data stream;
    copying the compressed data block into the allocated additional history section of the history buffer;
    tagging the compressed data block with a history size increase; and
    transmitting the tagged compressed data block over a network.

5. The method of claim 4, further comprising: compressing the data block using a short range compressor associated with the first data stream.

6. A method for compressing data blocks associated with a plurality of prioritized data streams, the method comprising:
    receiving a data block associated with a first data stream of the plurality of prioritized data streams, wherein each of the plurality of prioritized data streams is associated with a history buffer comprising one or more allocated history sections;
    determining if a history size increase is permitted for the history buffer of the first data stream based on a count of a number of history size increases previously granted to the plurality of prioritized data streams;
    compressing the data block using a long range compressor associated with the first data stream;
    determining if a history size decrease is desirable for a history buffer of any one of the plurality of prioritized data streams;
    in response to determining that a history size decrease is desirable, determining which of the plurality of prioritized data streams are eligible for a reduction in history size; and
    deallocating a history section from the history buffer of one of the plurality of prioritized data streams that are eligible for a reduction in history size.

7. The method of claim 6, further comprising: after deallocating a history section, transmitting a history decrease signaling block to a decompressor before transmitting a subsequent compressed data block for the data stream with the history buffer that was deallocated a history section.

8. The method of claim 6, wherein the determination of whether a history size decrease is desirable is made in response to a determination that a history size increase is desirable for the history buffer of the first data stream.

9. The method of claim 6, wherein deallocating a history section from the history buffer of one of the plurality of prioritized data streams comprises:
    selecting a stream among the plurality of prioritized data streams eligible for a reduction in history size that has a least recently compressed block of data; and
    deallocating a least recently used history section from the history buffer of the selected stream.

10. A compressor for compressing data blocks associated with a plurality of prioritized data streams, the compressor comprising:
    a processor; and
    a non-transitory computer-readable operatively coupled to the processor, and having instructions stored therein that when executed by the processor cause the compressor to:
        receive a data block associated with a first data stream of the plurality of prioritized data streams, wherein each of the plurality of prioritized data streams is associated with a history buffer comprising one or more allocated history sections;
        determine if a history size increase is permitted for the history buffer of the first data stream based on a count of a number of history size increases previously granted to the plurality of prioritized data streams, wherein a history size increase is permitted for the history buffer of the first data stream if a predetermined maximum history size is greater than a difference between the count of the number of history size increases previously granted and a maximum of all history section decrease counts received from a decompressor; and compress the data block using a long range compressor associated with the first data stream.

11. The compressor of claim 10, wherein the instructions, when executed by the processor, further cause the compressor to:

determine that a history size increase is permitted for the history buffer of the first data stream;

in response to determining that a history size increase is permitted, allocating an additional history section to the history buffer of the first data stream; and insert the allocated additional history section into the history buffer of the first data stream.

12. The compressor of claim 10, wherein the instructions, when executed by the processor, further cause the compressor to: determine if a history size increase is desirable for the history buffer of the first data stream based on a determination of whether the received data block would fit in a most recently used history section of the history buffer of the first data stream.

13. A compressor for compressing data blocks associated with a plurality of prioritized data streams, the compressor comprising:

a processor; and a non-transitory computer-readable operatively coupled to the processor, and having instructions stored therein that when executed by the processor cause the compressor to:

receive a data block associated with a first data stream of the plurality of prioritized data streams, wherein each of the plurality of prioritized data streams is associated with a history buffer comprising one or more allocated history sections;

determine if a history size increase is permitted for the history buffer of the first data stream based on a count of a number of history size increases previously granted to the plurality of prioritized data streams;

compress the data block using a long range compressor associated with the first data stream;

insert an allocated additional history section into the history buffer of the first data stream;

copy the compressed data block into the allocated additional history section of the history buffer;

tag the compressed data block with a history size increase; and transmit the tagged compressed data block over a network.

14. The compressor of claim 13, wherein the instructions, when executed by the processor, further cause the compressor to: compress the data block using a short range compressor associated with the first data stream.

15. A compressor for compressing data blocks associated with a plurality of prioritized data streams, the compressor comprising:

a processor; and a non-transitory computer-readable operatively coupled to the processor, and having instructions stored therein that when executed by the processor cause the compressor to:

receive a data block associated with a first data stream of the plurality of prioritized data streams, wherein each of the plurality of prioritized data streams is associated with a history buffer comprising one or more allocated history sections;

determine if a history size increase is permitted for the history buffer of the first data stream based on a count of a number of history size increases previously granted to the plurality of prioritized data streams;

compress the data block using a long range compressor associated with the first data stream;

determine if a history size decrease is desirable for a history buffer of any one of the plurality of prioritized data streams;

in response to determining that a history size decrease is desirable, determine which of the plurality of prioritized data streams are eligible for a reduction in history size; and deallocate a history section from the history buffer of one of the plurality of prioritized data streams that are eligible for a reduction in history size.

16. The compressor of claim 15, wherein the instructions, when executed by the processor, further cause the compressor to: after deallocating a history section, transmit a history decrease signaling block to a decompressor before transmitting a subsequent compressed data block for the data stream with the history buffer that was deallocated a history section.

17. The compressor of claim 15, wherein the determination of whether a history size decrease is desirable is made in response to a determination that a history size increase is desirable for the history buffer of the first data stream.

18. The compressor of claim 15, wherein deallocating a history section from the history buffer of one of the plurality of prioritized data streams comprises:

selecting a stream among the plurality of prioritized data streams eligible for a reduction in history size that has a least recently compressed block of data; and deallocating a least recently used history section from the history buffer of the selected stream.

* * * * *